United States Patent
Zuo et al.

(10) Patent No.: US 11,407,331 B2
(45) Date of Patent: Aug. 9, 2022

(54) BATTERY HEATING SYSTEM

(71) Applicant: Contemporary Amperex Technology Co., Limited, Ningde (CN)

(72) Inventors: Xiyang Zuo, Ningde (CN); Zhimin Dan, Ningde (CN); Wei Zhang, Ningde (CN); Yizhen Hou, Ningde (CN); Guowei Li, Ningde (CN); Xingyuan Wu, Ningde (CN); Yanru Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/972,574

(22) PCT Filed: Jan. 22, 2019

(86) PCT No.: PCT/CN2019/072663
§ 371 (c)(1),
(2) Date: Dec. 4, 2020

(87) PCT Pub. No.: WO2020/133615
PCT Pub. Date: Jul. 2, 2020

(65) Prior Publication Data
US 2021/0245628 A1 Aug. 12, 2021

(30) Foreign Application Priority Data
Dec. 29, 2018 (CN) .......................... 201822274044.X

(51) Int. Cl.
*B60L 58/27* (2019.01)
*H02P 27/08* (2006.01)
(Continued)

(52) U.S. Cl.
CPC ........... *B60L 58/27* (2019.02); *H01M 10/615* (2015.04); *H01M 10/63* (2015.04); *H02J 7/0031* (2013.01);
(Continued)

(58) Field of Classification Search
CPC ........... H01M 2220/20; H01M 10/625; H01M 10/63; B60L 58/27; H02J 7/0063; H02J 7/0031; H02P 27/08; H02P 29/68
See application file for complete search history.

(56) References Cited

U.S. PATENT DOCUMENTS 6,794,847 B2 *  9/2004  Hosoda ................. H02J 7/1492
                                                    320/104
7,382,102 B2 *  6/2008  Ashtiani ........... H02M 7/53871
                                                    318/139
(Continued)

FOREIGN PATENT DOCUMENTS

CN      103560304 A      2/2014
CN      104106205 B      5/2017
(Continued)

OTHER PUBLICATIONS

PCT International Search Report for PCT/CN2019/072663, dated Sep. 30, 2019, 15 pages.
(Continued)

*Primary Examiner* — Thai T Dinh
(74) *Attorney, Agent, or Firm* — Law Offices of Liaoteng Wang

(57) ABSTRACT

In a battery heating system an inverter includes a first-phase bridge arm, a second-phase bridge arm and a third-phase bridge arm connected in parallel, each of a upper bridge arm and a lower bridge arm is provided with a switch module, the switch module is connected in parallel with a buffer module; and a motor controller in the inverter is provided for
(Continued)

providing driving signals to the switch module of a target upper bridge arm and the switch module of a target lower bridge arm to control the switch module of the upper bridge arm of any bridge arm among the three phases of bridge arms and the switch module of the lower bridge arm of at least one bridge arm among the bridge arms except the bridge arm where the switch module of the target upper bridge arm is located to be periodically turned on and off.

13 Claims, 3 Drawing Sheets

(51) Int. Cl.
    *H01M 10/63*     (2014.01)
    *H01M 10/615*     (2014.01)
    *H02J 7/00*     (2006.01)
    *H01M 10/625*     (2014.01)

(52) U.S. Cl.
    CPC ............ *H02J 7/0063* (2013.01); *H02P 27/08* (2013.01); *H01M 10/625* (2015.04); *H01M 2220/20* (2013.01)

(56) References Cited

U.S. PATENT DOCUMENTS

| | | | | |
|---|---|---|---|---|
| 8,836,288 | B2* | 9/2014 | Xu | H01M 10/425 320/129 |
| 9,707,825 | B2* | 7/2017 | Najima | B60H 1/3226 |
| 10,256,626 | B2* | 4/2019 | Harper | H02H 9/045 |
| 2003/0231518 | A1* | 12/2003 | Peng | H02M 7/4826 363/98 |
| 2011/0251745 | A1* | 10/2011 | Yamamoto | B60W 20/13 701/22 |
| 2011/0298427 | A1* | 12/2011 | Uemura | B60L 50/51 320/134 |
| 2012/0280660 | A1* | 11/2012 | Aga | H01M 10/657 320/134 |
| 2016/0336743 | A1* | 11/2016 | Harper | H02H 9/045 |

FOREIGN PATENT DOCUMENTS

| | | | | |
|---|---|---|---|---|
| CN | 107231032 | A | | 10/2017 |
| CN | 108418493 | A | | 8/2018 |
| CN | 111347937 | A | * | 6/2020 ............. B60R 16/02 |
| CN | 111355000 | A | * | 6/2020 .......... H01M 10/615 |
| CN | 111355435 | A | * | 6/2020 |
| JP | 2008066288 | A | | 3/2008 |
| JP | 2010178582 | A | | 8/2010 |
| JP | 2011160617 | A | | 8/2011 |
| JP | 2014072955 | A | | 4/2014 |
| JP | 2014183680 | A | | 9/2014 |
| JP | 2014241434 | A | | 12/2014 |

OTHER PUBLICATIONS

The extended European search report for European Application No. 19902895.2, dated Nov. 8, 2021, 7 pages.
The First Office Action for Indian Application No. 202127028975, dated Feb. 23, 2022, 5 pages.
The Search Report for Japanese Application No. 2021-531835, dated May 31, 2022, 29 pages.
The First Office Action for Japanese Application No. 2021-531835, dated Jun. 22, 2022, 8 pages.
The First Office Action for Korean Application No. 2021-7017117, dated Jun. 23, 2022, 20 pages.

* cited by examiner

BATTERY HEATING SYSTEM

CROSS-REFERENCE TO RELATED APPLICATION

The present application is a National Stage of International Application No. PCT/CN2019/072663 filed on Jan. 22, 2019, which claims priority to Chinese Patent Application No. 201822274044.X, filed on Dec. 29, 2018 and entitled "BATTERY HEATING SYSTEM", which is incorporated herein by reference in its entirety.

TECHNICAL FIELD

The disclosure relates to the field of battery power, in particular to a battery heating system.

BACKGROUND

With development of new energies, these new energies are used in more and more fields as power. Due to advantages of high energy density, recyclable charging, safety and environmental protection, batteries are widely used in fields such as new energy vehicles, consumer electronics and energy storage systems.

However, utilization of a battery in a lower-temperature environments is subject to certain restrictions. Specifically, discharge capacity of the battery in a lower-temperature environment may be severely degraded, and the battery may not be charged in a lower-temperature environment. Therefore, it is necessary to heat the battery in a lower-temperature environment in order for normal utilization of the battery.

At present, the battery can be heated by equipping the battery with a special thermal circulation container and indirectly heating heat-conducting material in the thermal circulation container to conduct heat to the battery. However, this heating method takes a long time and has lower heating efficiency.

SUMMARY

The embodiments of the disclosure provides a battery heating system, which can improve heating efficiency of a battery pack and enhance safety of the battery heating system.

The disclosure provides a battery heating system, including a switch assembly connected to a battery pack, an inverter connected to the switch assembly, and a motor connected to the inverter; the inverter comprises a first-phase bridge arm, a second-phase bridge arm and a third-phase bridge arm connected in parallel, wherein each of the first-phase bridge arm, the second-phase bridge arm and the third-phase bridge arm includes an upper bridge arm and a lower bridge arm, the upper bridge arm is provided with a switch module, the lower bridge arm is provided with a switch module, the switch module is connected in parallel with a buffer module, and the buffer module is configured to protect the switch module; a first-phase input terminal, a second-phase input terminal and a third-phase input terminal of the motor are connected respectively to a connection point of the upper bridge arm and the lower bridge arm in the first-phase bridge arm, a connection point of the upper bridge arm and the lower bridge arm in the second-phrase bridge arm and a connection point of the upper bridge arm and the lower bridge arm in the third-phase bridge arm; and the inverter further comprises a motor controller for outputting driving signals to the switch module of a target upper bridge arm and the switch module of a target lower bridge arm to control the switch module of the target upper bridge arm and the switch module of the target lower bridge arm to be periodically turned on and off so as to generate an alternating current, wherein the switch module of the target upper bridge arm is the switch module of the upper bridge arm of any bridge arm among the first-phase bridge arm, the second-phase bridge arm and the third-phase bridge arm, and the switch module of the target lower bridge arm is the switch module of the lower bridge arm of at least one of the bridge arms except the bridge arm where the switch module of the target upper bridge arm is located.

The disclosure provides a battery heating system, in which the motor controller outputs driving signals to the switch module of the target upper bridge arm and the switch module of the target lower bridge arm to control the switch module of the target upper bridge arm and the switch module of the target lower bridge arm to be periodically turned on and off, such that an alternating current is generated in a circuit formed by the battery pack, the main positive switch, the switch module of the target upper bridge arm, the motor, the switch module of the target lower bridge arm and the main negative switch, that is, the battery pack is alternately charged and discharged. In the process of alternate charging and discharging of the battery pack, since there is an internal resistance in the battery pack, it will generates heat, that is, heat is generated internally in the battery pack, thereby improving heating efficiency of the battery pack. In addition to improvement of heating efficiency of the battery pack, the buffer module can absorb electric energy, which prevents a sudden change in the alternating current generated by the battery heating system (such as a spike voltage or the like) from damaging the battery heating system, and thereby enhancing safety of the battery heating system.

BRIEF DESCRIPTION OF THE DRAWINGS

The disclosure can be better understood from the following description of specific embodiments of the disclosure in conjunction with the accompanying drawings, in which the same or similar reference signs indicate the same or similar features.

DETAILED DESCRIPTION

Figure 1:
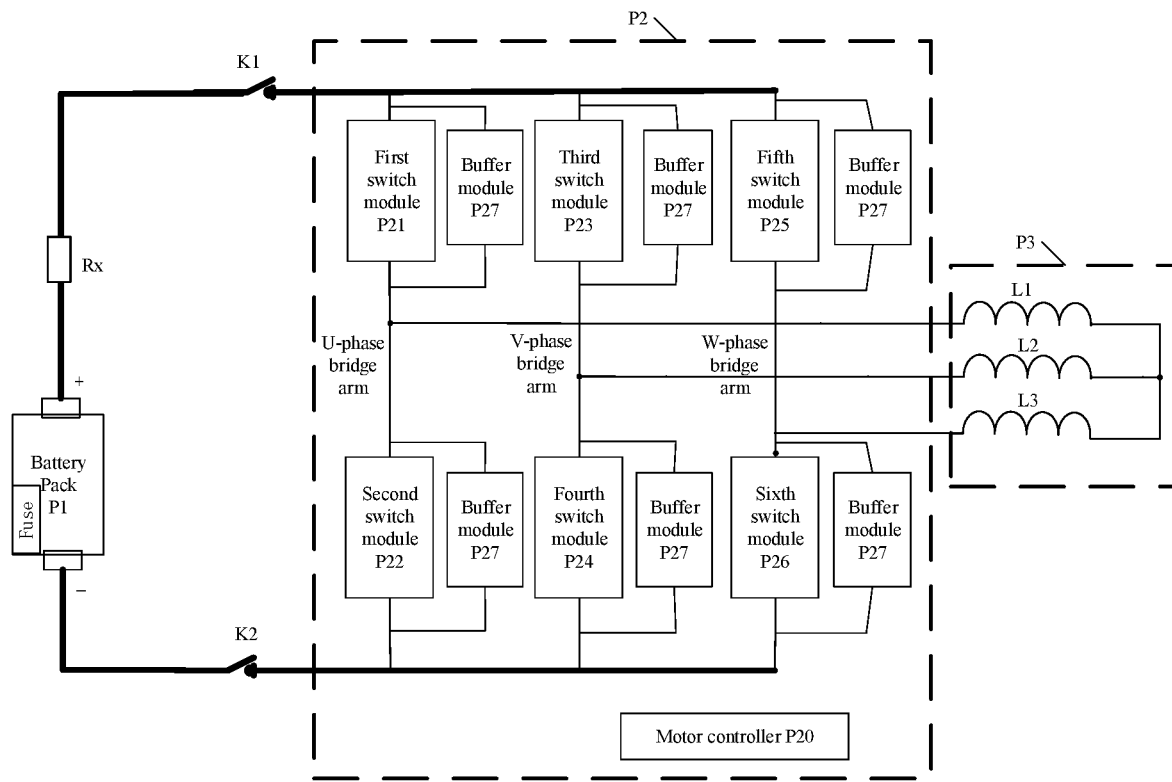
FIG. 1 is a schematic structural diagram of a battery heating system in an embodiment of the disclosure.

The features and exemplary embodiments of various aspects of the disclosure will be described in detail below. In the following detailed description, many specific details are proposed in order to provide a comprehensive understanding of the disclosure. However, it is obvious to those skilled in the art that the disclosure can be implemented without some of these specific details. The following description of the embodiments is only to provide a better understanding of the disclosure by showing examples of the disclosure. The disclosure is by no means limited to any specific configuration and algorithm proposed below, but covers any modification, replacement and improvement of elements, components and algorithms without departing from the gist of the disclosure. In the drawings and the following description, well-known structures and technologies are not shown in order to avoid unnecessary obscurity of the disclosure.

The embodiments of the disclosure provides a battery heating system, which can be applied to heat a battery pack under the condition that temperature of the battery pack is lower, such that the temperature of the battery pack rises and reaches a temperature at which the battery pack can be used normally. The battery pack may include at least one battery module or at least one battery unit, which is not limited herein. The battery pack can be used in an electric vehicle to supply power for a motor therein as a power source of the electric vehicle. The battery pack can also supply power for other electrical devices in the electric vehicle such as a vehicle-mounted air conditioner or player. In the embodiments of the disclosure, by controlling the battery heating system, an alternating current is generated in a circuit where the battery pack is located. The alternating current can continuously pass through the battery pack, so that heat is generated by an internal resistance of the battery pack, thereby realizing heating of the battery pack uniformly and efficiently.

FIG. 1 is a schematic structural diagram of a battery heating system in an embodiment of the disclosure. As shown in FIG. 1, the battery heating system includes a switch assembly connected to a battery pack P1, an inverter P2 connected to the switch assembly, and a motor P3 connected to the inverter P2.

The switch assembly is configured to switch on or off a circuit between the battery pack P1 and the battery heating system. In some examples, the switch assembly may include a main positive switch K1 connected to a positive electrode of the battery pack P1. Alternatively, the switch assembly may include a main negative switch K2 connected to a negative electrode of the battery pack P1. Alternatively, the switch assembly includes both the main positive switch K1 connected to the positive electrode of the battery pack P1 and the main negative switch K2 connected to the negative electrode of the battery pack P1. As shown in FIG. 1, the switch assembly includes the main positive switch K1 connected to the positive electrode of the battery pack P1 and the main negative switch K2 connected to the negative electrode of the battery pack P1. The main positive switch K1 and the main negative switch K2 may specifically be relays.

The inverter P2 includes a first-phase bridge arm, a second-phase bridge arm and a third-phase bridge arm connected in parallel. Each of the first-phase bridge arm, the second-phase bridge arm and the third-phase bridge arm includes an upper bridge arm and a lower bridge arm. And, the upper bridge arm is provided with a switch module, and the lower bridge arm is provided with a switch module.

The switch module is connected in parallel with a buffer module P27, and the buffer module P27 is configured to absorb electric energy, so as to prevent a spike voltage occurred in the battery heating system from burning the switch module. The buffer module P27 can absorb electric energy to ensure a smooth change in voltage of the switch module and avoid a sudden change, thereby protecting the switch module.

For example, as shown in FIG. 1, the first-phase bridge arm is a U-phase bridge arm, the second-phase bridge arm is a V-phase bridge arm, and the third-phase bridge arm is a W-phase bridge arm. The switch module of the upper bridge arm of the U-phase bridge arm is the first switch module P21, and the switch module of the lower bridge arm of the U-phase bridge arm is the second switch module P22. The switch module of the upper bridge arm of the V-phase bridge arm is the third switch module P23, and the switch module of the lower bridge arm of the V-phase bridge arm is the fourth switch module P24. The switch module of the upper bridge arm of the W-phase bridge arm is the fifth switch module P25, and the switch module of the lower bridge arm of the W-phase bridge arm is the sixth switch module P26.

In some examples, the switch module may include one or more of power switch devices such as an insulated gate bipolar transistor (Insulated Gate Bipolar Transistor, IGBT) chip, an IGBT module, a metal-oxide semiconductor field-effect transistor (Metal-Oxide-Semiconductor Field-Effect Transistor, MOSFET), Si-MOS transistor wafer (Si is silicon), SiC-MOS transistor wafer (SiC is silicon carbide), power MOS transistor, SiC power MOS transistor. The combination and connection of the various IGBT devices and MOSFET devices in the switch module are not limited herein. The type of material of the above-mentioned power switch devices is not limited either, for example, a power switch device made from silicon carbide (i.e. SiC) or other materials can be used. It is worth mentioning that the above-mentioned power switch devices comprises a diode, which may be a parasitic diode or a diode specially arranged. The type of material of the diode is not limited either, for example, a diode made from silicon (i.e. Si), and silicon carbide (i.e. SiC) or other materials can be used.

A first-phase input terminal, the second-phase input terminal and the third-phase input terminal of the motor P3 are connected respectively to a connection point of the upper and lower bridge arms in the first-phase bridge arm, a connection point of the upper and lower bridge arms in the second-phase bridge arm and a connection point of the upper and lower bridge arms in the third-phase bridge arm.

For example, as shown in FIG. 1, a stator of the motor P3 is considered as three-phase stator inductors. The stator inductors have a function of energy storage. Each of the three-phase stator inductors is connected to a phrase of bridge arm. The three-phase stator inductors are the first stator inductor L1, the second stator inductor L2 and the third stator inductor L3. The first-phase input terminal is the input terminal corresponding to the first stator inductor L1. The second-phase input terminal is the input terminal corresponding to the second stator inductor L2. The third-phase input terminal is the input terminal corresponding to the third stator inductor L3. It is worth mentioning that the first-phase input terminal, the second-phase input terminal and the third-phase input terminal of the motor P3 can be used as input terminals to input current, and can be used as output terminals to output current.

Specifically, one terminal of the first stator inductor L1 is the first-phase input terminal, and the other terminal of the first stator inductor L1 is connected to one terminal of the second stator inductor L2 and one terminal of the third stator inductor L3. The other terminal of the second stator inductor L2 is the second-phase input terminal. The other terminal of the third stator inductance L3 is the third-phase input terminal.

The inverter P2 also includes a motor controller P20, which is provided for outputting driving signals to the switch module of a target upper bridge arm and the switch module of a target lower bridge arm to control the switch module of the target upper bridge arm and the switch module of the target lower bridge arm to be periodically turn on and off to generate an alternating current.

It should be noted that the motor controller P20 is connected to each of the switch modules in the inverter P2.

For example, the motor controller P20 can be connected to each of a control terminal of the first switch module P21, a control terminal of the second switch module P22, a control terminal of the third switch module P23, a control terminal of the fourth switch module P24, a control terminal of the fifth switch module P25 and a control terminal of the sixth switch module P26, which are shown in FIG. 1, to send a driving signal to each of the switch modules. This connection relationship is not shown in FIG. 1.

The driving signal may specifically be a pulse signal. Further, the driving signal may be a pulse width modulation (Pulse Width Modulation, PWM) signal. In some examples, a high level in the driving signal can drive the switch module to turn on, and a low level signal in the driving signal can drive the switch module to turn off. The driving signal can control the switch module of the target upper bridge arm and the switch module of the target lower bridge arm to be turned on and off periodically.

The switch module of the target upper bridge arm is the switch module of the upper bridge arm of any bridge arm among the first-phase bridge arm, the second-phase bridge arm and the third-phase bridge arm. The switch module of the target lower bridge arm is the switch module of the lower bridge arm of at least one bridge arm other than the bridge arm where the switch module of the target upper bridge arm is located.

It should be noted that the switch modules that have not be driven by the drive signal (that is, those switch modules other than the switch module of the target upper bridge arm and the switch module of the target lower bridge arm) are all turned off.

For example, as shown in FIG. 1, in the case where the switch module of the target upper bridge arm is the first switch module P21, the switch module of the target lower bridge arm is the fourth switch module P24 and/or the sixth switch module P26. In the case where the switch module of the target upper bridge arm is the third switch module P23, the switch module of the target lower bridge arm is the second switch module P22 and/or the sixth switch module P26. In the case where the switch module of the target upper bridge arm is the fifth switch module P25, then the switch module of the target lower bridge arm is the second switch module P22 and/or the fourth switch module P24.

It should be noted that the switch module of the target upper bridge arm and the switch module of the target lower bridge arm turned on and off periodically in respective cycles may be the same or different, which is not limited herein. For example, the driving signal in every cycle always drives the first switch module P21 and the fourth switch module P24 to be turned on and off. For another example, in the first cycle, the driving signal drives the first switch module P21 and the fourth switch module P24 to be turned on and off; in the second cycle, the driving signal drives the third switch module P23 and the second switch Module P22 to be turned on and off; in the third cycle, the driving signal drives the first switch module P21, the fourth switch module P24 and the sixth switch module P26 to be turned on and off; that is, the switch module of the target upper bridge arm and the switch module of the target lower bridge arm driven by the driving signals in a different cycle are different.

The switch module of the target upper bridge arm and the switch module of the target lower bridge arm are driven periodically by the driving signals to be turned on and off, so that an alternating current is generated in a circuit formed by the battery pack P1, the main positive switch K1, the switch module of the target upper bridge arm, the motor P3, and the switch module of the target lower bridge arm and the main negative switch K2. Specifically, an alternating sine wave current can be generated. That is, the battery pack P1 is charged and discharged alternately. During the alternate charging and discharging process of the battery pack P1, the battery pack P1 generates heat, that is, heat is generated within the battery pack P1 internally, thereby achieving heating of the battery pack P1.

In some examples, the frequency of the driving signal ranges from 100 Hz to 100000 Hz. The frequency of the drive signal is the switching frequency of the switch module. The duty cycle of the driving signal ranges from 5% to 50%. The duty cycle of the driving signal represent a ratio of duration of turn-on of the switch module with respect to a sum of the duration of turn-on and a duration of turn-off of the switch module.

In FIG. 1, the resistance between the battery pack P1 and the main positive switch K1 is an equivalent internal resistance Rx of the battery pack P1. The internal resistance of the battery pack P1 increases when the temperature is lower. For example, the internal resistance of a lithium-ion battery at −25° C. is 5 to 15 times as big as that of the lithium-ion battery at 25° C. During the alternate charging and discharging process of the battery pack P1, the heat generated is greater and the heating speed is faster. A fuse can also be provided inside the battery pack P1 to ensure safe utilization of the battery pack P1.

In some examples, the main positive switch K1 and the main negative switch K2 may be packaged in a high voltage box.

In the embodiments of the disclosure, the motor controller P20 in the battery heating system outputs driving signals to the switch module of a target upper bridge arm and the switch module of a target lower bridge arm to control the switch module of the target upper bridge arm and the switch module of the target lower bridge arm to be periodically turned on and off, so that an alternating current is generated in a circuit formed by the battery pack P1, the main positive switch K1, the switch module of the target upper bridge arm, the motor P3, the switch module of the target lower bridge arm and the main negative switch K2, that is, the battery pack P1 is alternately charged and discharged. In addition to the alternate charging and discharging process of the battery pack P1, since there is an internal resistance in the battery pack P1, heat is thus generated, that is, the battery pack P1 generates heat internally, thereby improving heating efficiency of the battery pack P1. During improvement of heating efficiency of the battery pack P1, the buffer module P27 can absorb electric energy to protect the switch modules, which prevents a sudden change in the alternating current generated by the battery heating system (such as a spike voltage or the like) from damaging the battery heating system, and thereby enhancing safety of the battery heating system.

Further, the heat in the embodiments of the disclosure is generated due to the alternating current passing through the battery pack P1, so the battery pack P1 generates heat internally and uniformly, thereby further improving heating efficiency of the battery pack P1. Moreover, since structures of the inverter P2 and the motor P3 have not been changed, no additional structural transformation costs will be incurred.

Figure 2:
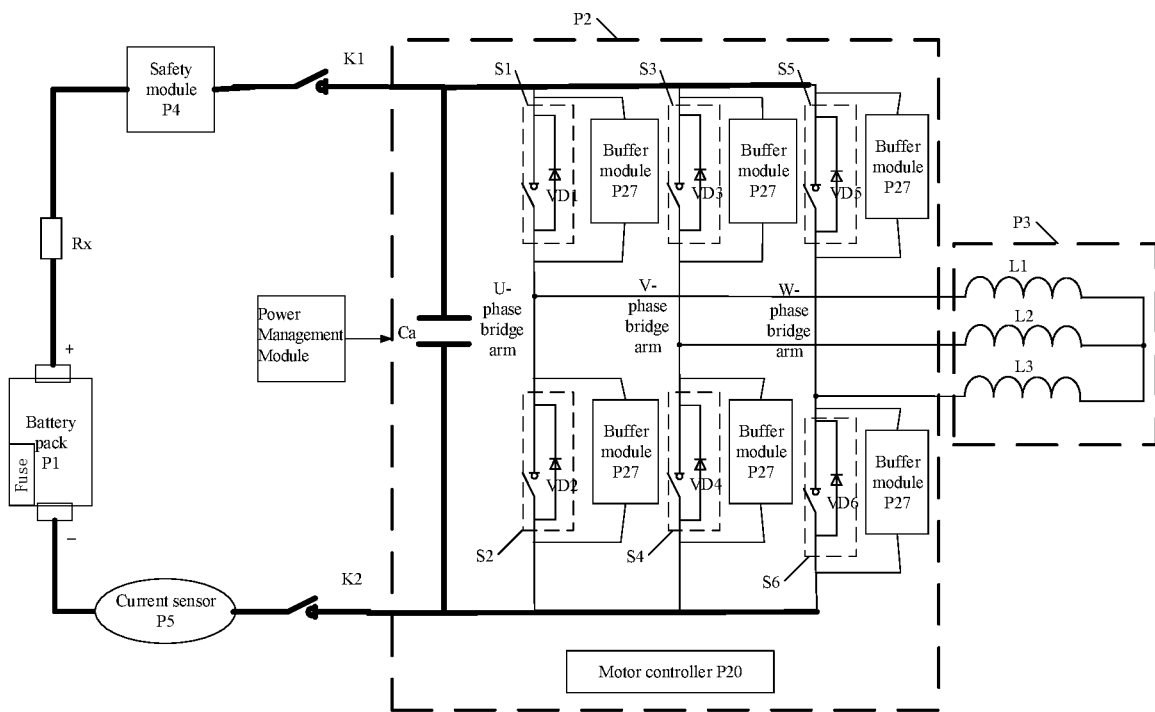
FIG. 2 is a schematic structural diagram of a battery heating system in another embodiment of the disclosure.

In the following, an example where each switch module includes one power switch device is taken for description. FIG. 2 is a schematic structural diagram of a battery heating system in another embodiment of the disclosure. FIG. 2 differs from FIG. 1 in that the switch module includes a power switch device. The inverter P2 further includes a supporting capacitor. The battery heating system further includes a safety module P4 provided between the positive electrode of the battery pack P1 and the main positive switch K1, and a current sensor P5 provided between the negative electrode of the battery pack P1 and the main negative switch K2.

For ease of description, FIG. 2 shows a diode of a power switch device in the switch module. In terms of the switch module of the upper bridge arm, an anode of the diode is connected to a connection point of the upper bridge arm and the lower bridge arm, and a cathode of the diode is located between the upper bridge arm and the positive electrode of the battery pack P1. In terms of the switch module of the lower bridge arm, the anode of the diode is located between the lower bridge arm and the negative electrode of the battery pack P1, and the cathode of the diode is connected to the connection point of the upper bridge arm and the lower bridge arm. For example, as shown in FIG. 2, the cathode of the diode of the switch module of the upper bridge arm is connected to one terminal of the upper bridge arm that is connected to the main positive switch K1. The anode of the diode of the switch module of the lower bridge arm is connected to one terminal of the lower bridge arm that is connected to the main negative switch K2.

As shown in FIG. 2, the first switch module P21 includes a first power switch device S1, the second switch module P22 includes a second power switch device S2, the third switch module P23 includes a third power switch device S3, a fourth switch module P24 includes a fourth power switch device S4, the fifth switch module P25 includes a fifth power switch device S5, and the sixth switch module P26 includes a sixth power switch device S6. The diode of the first power switch device S1 is VD1, the diode of the second power switch device S2 is VD2, the diode of the third power switch device S3 is VD3, the diode of the fourth power switch device S4 is VD4, the diode of the fifth power switch device S5 is VD5, and the diode of the sixth power switch device S6 is VD6.

By driving the switch module of the target upper bridge arm and the switch module of the target lower bridge arm with the driving signal, a discharge circuit for the battery pack P1 is formed, with a current direction from the battery pack P1→the safety module P4→the main positive switch K1→the switch module of the target upper bridge arm→the stator inductor corresponding to the switch module of the target upper bridge arm→the stator inductor corresponding to the switch module of the target lower bridge arm→the switch module of the target lower bridge arm→the main negative switch K2→the current sensor P5→the battery pack P1.

For example, the motor controller P20 sends a drive signal to the first power switch device S1 and the fourth power switch device S4 drives the first power switch device S1 and the fourth power switch device S4 to be turned on. The battery pack P1 is discharged to form a discharge circuit for the battery pack P1. The current direction is from the battery pack P1→the safety module P4→the main positive switch K1→first power switching device S1→the first stator inductor L1→the second stator inductor L2→the fourth power switching device S4→the main negative switch K2→the current sensor P5→the battery pack P1.

For another example, the motor controller P20 sends a driving signal to the first power switch device S1, the fourth power switch device S4 and the sixth power switch device S6 to drive the first power switch device S1, the fourth power switch device S4, and the sixth power switch device S6 to be turned on. The battery pack P1 is discharged to form a discharge circuit for the battery pack P1. The current direction is from the battery pack P1→the safety module P4→the main positive switch K1→the first power switch device S1→the first stator inductor L1→the second stator inductor L2 and the third stator inductor L3→the fourth power switch device S4 and the sixth power switch device S6→the main negative switch K2→the current sensor P5→the battery pack P1. That is, the second stator inductor L2 and the third stator inductor L3 are connected in parallel, and then connected in series with the first stator inductor L1.

When the drive signals drives the switch module of the target upper bridge arm and the switch module of the target lower bridge arm to be turned off, the stator inductor is discharged due to its energy storage function to form a charging circuit for the battery pack P1, with a current direction from the stator inductor corresponding to the switch module of the target upper bridge arm→the diode of the switch module of the target upper bridge arm→the main positive switch K1→the safety module P4→the battery pack P1→the current sensor P5→the main negative switch K2→the diode of the switch module of the target lower bridge arm→the stator inductor corresponding to the switch module of the target lower bridge arm.

For example, the motor controller P20 sent a drive signal to the first power switch device S1 and the fourth power switch device S4 to drive the first power switch device S1 and the fourth power switch device S4 to be turned off. The first stator inductor and the second stator inductor are discharged to charge the battery pack P1 so as to form a charging circuit for the battery pack P1. The current direction is from the first stator inductor L1→the diode VD1 of the first power switch device S1→the main positive switch K1→the safety module P4→the battery pack P1→the current sensor P5→the main negative switch K2→the diode VD4 of the fourth power switch device S4→the second stator inductor L2.

For another example, the motor controller P20 sends a driving signal to the first power switch device S1, the fourth power switch device S4 and the sixth power switch device S6 to drive the first power switch device S1, the fourth power switch device S4 and the sixth power switch device S6 to be turned off. The first stator inductor L1, the second stator inductor L2, and the third stator inductor L3 are discharged to charge the battery pack P1 so as to form a charging circuit for the battery pack P1. The current direction is from the first stator inductor L1→the diode VD1 of the first power switch device S1→the main positive switch K1→the safety module P4→the battery pack P1→the current sensor P5→the main negative switch K2→the diode VD4 of the fourth power switch device S4 and the diode VD6 of the sixth power switch device S6→the second stator inductor L2 and the third stator inductor L3.

The supporting capacitor Ca is connected in parallel with the first-phase bridge arm. Similarly, the supporting capacitor Ca is connected in parallel with the second-phase bridge arm and the third-phase bridge arm. One terminal of the support capacitor Ca is connected to a terminal of the first-phase bridge arm that is connected to the main positive switch K1, and the other terminal of the support capacitor Ca is connected to a terminal of the first-phase bridge arm that is connected to the main negative switch K2.

In the heating process of the battery heating system, the on-off state of the power switch device in the switch module will be constantly switched, so the generated current varies constantly. The generated variable current continues to pass through the battery pack P1, then a ripple voltage will be caused due to a certain voltage drop in the battery pack P1.

The supporting capacitor Ca can be used to smooth the busbar voltage, which can further reduce the ripple voltage of the battery pack P1 to maintain stability of the battery heating system.

There are stray inductances in wiring harness of the battery heating system, and when the power switch device in the switch module is turned off, the stray inductance will generate a very high spike voltage, which may burn the power switch device. The supporting capacitor Ca divides the stray inductance from the battery pack P1 to the power switch device into two parts. In the presence of the supporting capacitor Ca, when the power switch device is turned off, stray inductance that generates the spike voltage is originated from only the stray inductance corresponding to the section of the wiring harness from the supporting capacitor Ca to the power switch device. That is, the supporting capacitor Ca is further used to reduce stray inductance of the wiring harness.

Figure 3:
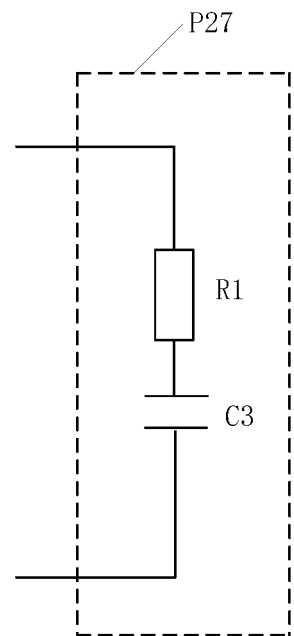
FIG. 3 is a schematic structural diagram of a buffer module in an embodiment of the disclosure.

In some examples, FIG. 3 is a schematic structural diagram of a buffer module P27 in an embodiment of the disclosure. As shown in FIG. 3, the buffer module P27 includes a first resistor R1 and a third capacitor C3.

In terms of the buffer module P27 connected in parallel to a switch module of an upper bridge arm, one terminal of the first resistor R1 is located between the switch module of the upper bridge arm and the positive electrode of the battery pack P1, the other terminal of the first resistor R1 is connected to one terminal of the third capacitor C3, the other terminal of the third capacitor C3 is connected to a connection point of the upper bridge arm and the lower bridge arm. For example, in the case where the switch module of the upper bridge arm is the first switch module P21, one terminal of the first resistor R1 is connected to a terminal of the first power switch device S1 that is connected to the main positive switch K1, the other terminal of the third capacitor C3 is connected to a connection point of the upper bridge arm and the lower bridge arm of the U-phase bridge arm.

In terms of the buffer module P27 connected in parallel to a switch module of a lower bridge arm, one terminal of the first resistor R1 is connected to a connection point of the upper bridge arm and the lower bridge arm, the other terminal of the first resistor R1 is connected to one terminal of the third capacitor C3, the other terminal of the capacitor C3 is located between the switch module of the lower bridge arm and the negative electrode of the battery pack P1. For example, in the case where the switch module of the lower bridge arm is the second switch module P22, one terminal of the first resistor R1 is connected to a connection point of the upper bridge arm and the lower bridge arm of the U-phase bridge arm, and the other terminal of the third capacitor C3 is connected to one terminal of the second power switch device S2 that is connected to the main negative switch K2.

Further, the first resistor R1 has a resistance ranging from 0.1 ohm to 20 ohms. The third capacitor C3 has a capacitance ranging from 0.1 microfarads to 15 microfarads.

Figure 4:
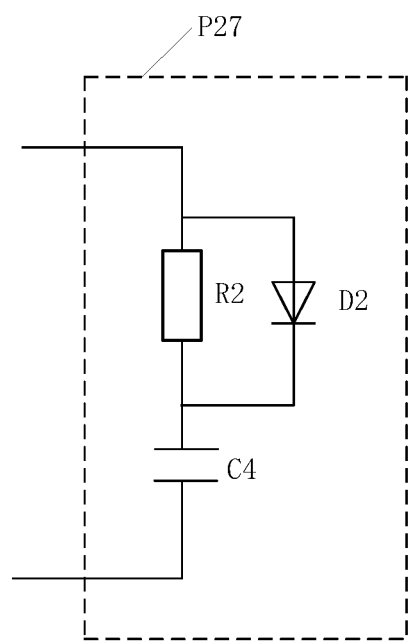
FIG. 4 is a schematic structural diagram of another buffer module in an embodiment of the disclosure.

In other examples, FIG. 4 is a schematic structural diagram of another buffer module P27 in an embodiment of the disclosure. As shown in FIG. 4, the buffer module P27 includes a second resistor R2, a fourth capacitor C4 and a second diode D2.

In terms of the buffer module P27 connected in parallel to a switch module of a upper bridge arm, one terminal of the second resistor R2 is located between the switch module of the upper bridge arm and the positive electrode of the battery pack P1, the other terminal of the second resistor R2 is connected to one terminal of the fourth capacitor C4, the other terminal of the fourth capacitor C4 is connected to the connection point of the upper bridge arm and the lower bridge arm, the anode of the second diode D2 is connected to the one terminal of the second resistor R2, and the cathode of the second diode D2 is connected to the other terminal of the second resistor R2. For example, in the case where the switch module of the upper bridge arm is the first switch module P21, one terminal of the second resistor R2 is connected to one terminal of the first power switch device S1 that is connected to the main positive switch K1, and the other terminal of the fourth capacitor C4 is connected to the connection point of the upper bridge arm and the lower bridge arm of the U-phase bridge arm.

In terms of the buffer module P27 connected in parallel to a switch module of a lower bridge arm, one terminal of the second resistor R2 is connected to the connection point of the upper bridge arm and the lower bridge arm, and the other terminal of the second resistor R2 is connected to one terminal of the fourth capacitor C4, the other terminal of the capacitor C4 is located between the switch module of the lower arm and the negative electrode of the battery pack P1, the anode of the second diode D2 is connected to the one terminal of the second resistor R2, and the cathode of the second diode D2 is connected to the other terminal of the second resistor R2. For example, in the case where the switch module of the lower bridge arm is the second switch module P22, one terminal of the second resistor R2 is connected to the connection point of the upper bridge arm and the lower bridge arm of the U-phase bridge arm, and the other terminal of the fourth capacitor C4 is connected to one terminal of the second power switch device S2 that is connected to the main negative switch K2.

Further, the second resistor R2 has a resistance ranging from 0.1 ohm to 20 ohm. The fourth capacitor C4 has a capacitance ranging from 0.1 microfarad to 15 microfarad. The second diode D2 may be a Schottky diode, a SiC diode, or the like.

Since stray inductance on the wiring harness in the battery heating system may cause a voltage spike, in the embodiment of the disclosure, the buffer module P27 in the embodiment provides a path for current in a short time when the power switch device in the switch module is turned off, such that turn-off of the power switch device will take effect only after the capacitor in the buffer module P27 (the third capacitor C3 or the fourth capacitor C4) has been fully charged or discharged.

A high voltage to burn the power switch device should be avoid. When the power switch device in the switch module is turned on, the capacitor (the third capacitor C3 or the fourth capacitor C4) in the buffer module P27 in the above embodiment can absorb electric energy, and then the energy stored in the capacitor can be consumed by the resistor (the first resistor R1 or the second resistor R2), so that the voltage across the power switch device rises slowly until it reaches the busbar voltage, which avoids an instantaneous rise in voltage that may burn the power switch device, thereby protecting the power switch device in the switch module and enhancing safety of battery heating system.

It should be noted that the minimum turn-on during of the power switch device is determined by a time constant of the buffer module P27. The time constant of the buffer module P27 is $\mathcal{T} = RC$, where R is a resistance value of the resistor (the first resistor R1 or the second resistor R2) in the buffer module P27, and C is a capacitance value of the capacitor (the third capacitor C3 or the fourth capacitor C4) in the buffer module P27.

In some examples, the battery heating system further includes a safety module P4 disposed between the positive electrode of the battery pack P1 and the switch assembly. In the case where the switch assembly includes the main positive switch K1 or the switch assembly includes both the main positive switch K1 and the main negative switch K2, the safety module P4 is disposed between the positive electrode of the battery pack P1 and the main positive switch K1. In the case where the switch assembly includes the main negative switch K2, the safety module P4 is disposed between the positive electrode of the battery pack P1 and the inverter P2.

The safety module P4 is configured to disconnect the battery pack P1 from the battery heating system. In some examples, the safety module P4 may be a manual maintenance switch (Manual Service Disconnect, MSD).

The battery heating system may further include a current sensor P5 disposed between the negative electrode of the battery pack P1 and the switch assembly. In the case where the switch assembly includes the main negative switch K2, or the switch assembly includes both the main positive switch K1 and the main negative switch K2, the safety module P4 is disposed between the negative electrode of the battery pack P1 and the main negative switch K2. In the case where the switch assembly includes the main positive switch K1, the safety module P4 is disposed between the negative electrode of the battery pack P1 and the inverter P2.

The current sensor P5 is provided for collecting current.

In some examples, the battery heating system may further includes a battery management module (not shown in FIG. 2). The battery management module is provided for sending control signal to the motor controller P20 to control the motor controller P20 to output a driving signal. In some examples, the battery management module may be packaged together with the main positive switch K1 and the main negative switch K2 in a high-voltage box.

In some examples, the battery management module may collect temperature and state of charge of the battery pack P1. When the collected temperature of the battery pack P1 is lower than a heating temperature threshold and the state of charge is higher than a heating allowable state of charge threshold, the battery management module sends a control signal to the motor controller P20 to control the motor controller P20 to output a driving signal.

In some examples, the battery management module collects status parameters of the battery pack P1, and when the status parameters are out of a parameter safety range, it sends a stop signal to the motor controller P20 to control the battery controller to stop outputting the driving signal. The motor controller P20 adjusts frequency and duty cycle of the outputted driving signal to desired frequency and desired duty cycle, and controls turn-on duration and turn-off duration of the switch module of the target upper bridge arm and the switch module of the target lower bridge arm.

In some examples, when the battery management module determines that the temperature of the battery pack P1 reaches an expected temperature threshold, it sends a stop signal to the motor controller P20. The motor controller P20 receives the stop signal and stops outputting the drive signal.

In some examples, the battery management module calculates desired frequency and desired duty ratio of the driving signal based on the collected status parameters, and sends the desired frequency and the desired duty ratio of the driving signal to the motor controller P20.

In some examples, the motor controller P20 collects temperature of the switch module, and stops outputting the drive signal when the temperature of the switch module is out of a switch temperature safety threshold.

The above-mentioned current sensor P5 may further upload current parameters to the battery management module for analysis and calculation by the battery management module. The battery management module may further wake up the current sensor P5 before sending a control signal to the motor controller P20.

In some examples, the battery heating system may further include a vehicle controller (not shown in FIG. 2) configured to open communication permission between the battery management module and the motor controller P20 in response to a communication request from the shown battery management module, such that the battery management module and the motor controller P20 can communicate through a handshake to establish a communication connection between the battery management module and the motor controller P20.

Figure 5:
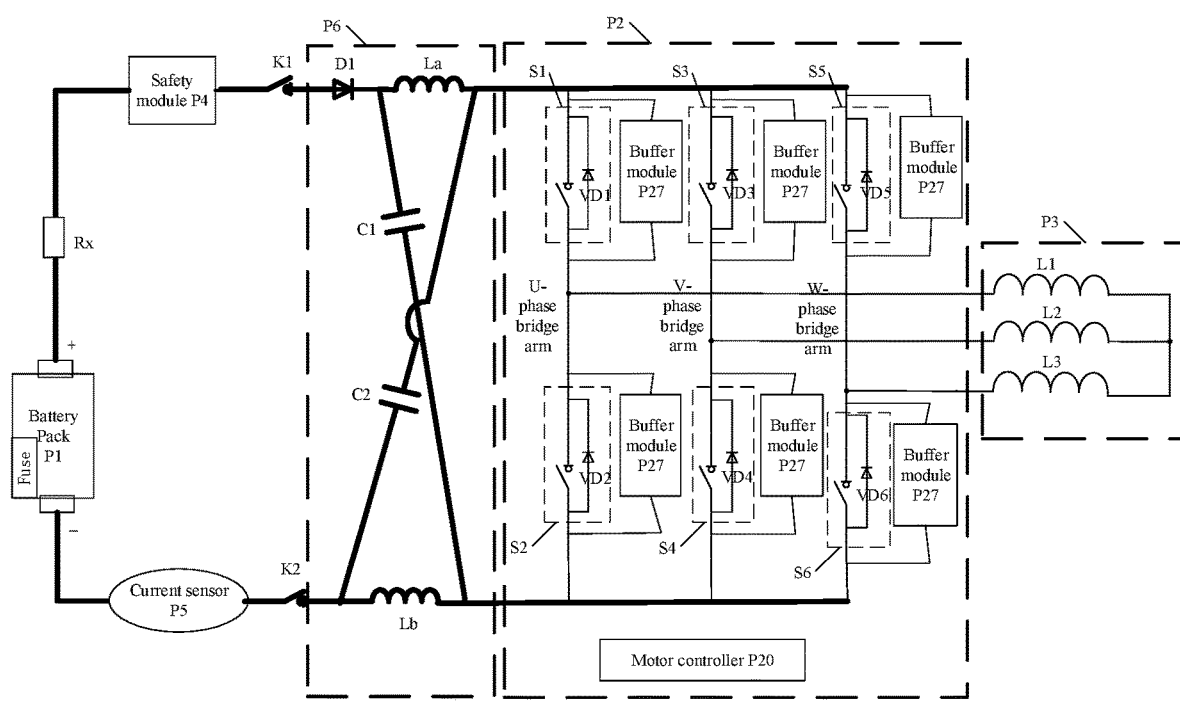
FIG. 5 is a schematic structural diagram of a battery heating system in another embodiment of the disclosure.

FIG. 5 is a schematic structural diagram of a battery heating system in another embodiment of the disclosure. FIG. 5 differs from FIG. 3 in that the battery heating system shown in FIG. 5 does not include a supporting capacitor. The battery heating system shown in FIG. 5 further includes a Z-source network circuit.

The Z-source network circuit is located between the switch assembly and the inverter P2. The Z-source network circuit is configured to disconnect the circuit where the inverter P2 and the battery pack P1 are located when a switch module of a upper bridge arm and a switch module of a lower bridge arm of any one of the first-phase bridge arm, the second-phase bridge arm and the third-phase bridge arm are turned on at the same time.

If a switch module of an upper bridge arm and a switch module of a lower bridge arm of a same bridge arm are turned on at the same time, a large current will be generated in the battery heating system, which may cause the power switching device in the switch modules to be burned. In the embodiment of the disclosure, the Z-source network circuit can disconnect the circuit where the inverter P2 and the battery pack P1 are located when a switch module of an upper bridge arm and a switch module of a lower bridge arm of a same bridge arm are both turned on, even though the circuit of the battery heating system is disconnected, so that it prevents the power switching device in the switch module from being burned, and safety of the battery heating system is enhanced.

In some examples, as shown in FIG. 5, the Z-source network circuit includes a first diode D1, a first inductor La, a first capacitor C1, a second inductor Lb and a second capacitor C2.

The anode of the first diode D1 is connected to the positive electrode of the battery pack P1, and the cathode of the first diode D1 is connected to one terminal of the first inductor La and one terminal of the first capacitor C1. The other terminal of the first inductor La is connected to one terminal of the second capacitor C2 and the inverter P2. The other terminal of the first capacitor C1 is connected to the other terminal of the second inductor Lb and the inverter P2. One terminal of the second inductor Lb is connected to the negative electrode of the battery pack P1 and the other terminal of the second capacitor C2, and the other terminal of the second inductor Lb is connected to the inverter P2. The one terminal of the second capacitor C2 is connected to the inverter P2.

The U-phase bridge arm in FIG. 5 is taken as an example for description as below, where the first inductor La and the second inductor Lb can convert electric energy into electromagnetic energy and store it in the first inductor La and the second inductor Lb. In the case where the first power switch device S1 and the second power switch device S2 in the U-phase bridge arm are turned on at the same time, the first inductor La and the first capacitor C1 are connected in parallel, and the first inductor La is freewheeled by the first capacitor C1. The first inductor La, the first power switch device S1, the second power switch device S2 and the first capacitor C1 form a circuit. The first inductor La releases energy, then the voltage across the first capacitor C1 at the right side of the first capacitor C1 increases. The voltage across the first capacitor C1 at the left side of the first capacitor C1 is the voltage across the battery pack P1. When the voltage across the first capacitor C1 at the right side of the first capacitor C1 is higher than the voltage across the first capacitor C1 at the left side of the first capacitor C1, the first diode D1 is turned off, so that the path between the battery pack P1 and the inverter P2 is disconnected. In the same way, in the case where the first power switch device S1 and the second power switch device S2 in the U-phase bridge arm are both turned on, the second inductor Lb and the second capacitor C2 are connected in parallel, and the second inductor Lb is freewheeled by the second capacitor C2. The second inductor Lb, the first power switch device S1, the second power switch device S2 and the second capacitor C2 form a circuit. The second inductor Lb releases energy, then the voltage across the second capacitor C2 at the right side of the second capacitor C2 increases. The voltage across the second capacitor C2 at the left side of the second capacitor C2 is the voltage across the battery pack P1. When the voltage across the second capacitor C2 at the right side of the second capacitor C2 is higher than the voltage across the second capacitor C2 at the left side of the second capacitor C2, the second diode D2 is turned off, so that the path between the battery pack P1 and the inverter P2 is disconnected. This prevents the first power switch device S1 and the second power switch device S2 from being burned.

If the first power switch device S1 and the second power switch device S2 in the U-phase bridge arm are not both turned on, the first diode D1 is turned on. The first capacitor C1 is charged through a circuit formed by the battery pack P1, the first capacitor C1 and the second inductor Lb. The second capacitor C2 is charged through a circuit formed by the battery pack P1, the second capacitor C2 and the first inductor La. The first inductor La and the second inductor Lb provide energy to loads behind the Z-source network circuit.

It should be note that the various embodiments in this specification are described in a progressive manner, the same or similar parts between the various embodiments can be referred to each other, and each embodiment focuses on differences from other embodiments. The disclosure is not limited to the specific structure described above and shown in the figures. Those skilled in the art can make various changes, modifications and additions after understanding the gist of the disclosure.

Those skilled in the art should understand that the above-mentioned embodiments are all illustrative and not restrictive. Different technical features appearing in different embodiments can be combined to achieve beneficial effects. Those skilled in the art will be able to understand and implement other alternatives of the disclosed embodiments after studying the drawings, the description and the claims. In the claims, the term "comprising" does not exclude other devices or steps; the indefinite article "a" or "an" refers to one or more; the terms "first" and "second" are used to indicate names rather than to indicate any specific order. Any reference signs in the claims should not be construed as limiting of the protection scope. The functions of multiple parts appearing in the claims can be implemented by a single hardware or software module. The appearance of certain technical features in different dependent claims does not mean that these technical features cannot be combined to achieve beneficial effects.

What is claimed is:

1. A battery heating system, comprising a switch assembly connected to a battery pack, an inverter connected to the switch assembly, and a motor connected to the inverter;
   the switch assembly comprises a main positive switch connected to a positive electrode of the battery pack and a main negative switch connected to a negative electrode of the battery pack;
   the inverter comprises a first-phase bridge arm, a second-phase bridge arm and a third-phase bridge arm connected in parallel, wherein the first-phase bridge arm, the second-phase bridge arm and the third-phase bridge arm comprise respective upper bridge arms and lower bridge arms, each of the upper bridge arms and the lower bridge arms is provided with a switch module, the switch module is connected in parallel with a buffer module, and the buffer module is configured to protect the switch module;
   a first-phase input terminal, a second-phase input terminal and a third-phase input terminal of the motor are connected respectively to a connection point of the upper bridge arm and the lower bridge arm in the first-phase bridge arm, a connection point of the upper bridge arm and the lower bridge arm in the second-phrase bridge arm and a connection point of the upper bridge arm and the lower bridge arm in the third-phase bridge arm; and
   the inverter further comprises a motor controller for outputting driving signals to the switch module of a target upper bridge arm and the switch module of a target lower bridge arm to control the switch module of the target upper bridge arm and the switch module of the target lower bridge arm to be periodically turned on and off so as to generate an alternating current, wherein the switch module of the target upper bridge arm is the switch module of the upper bridge arm of any bridge arm among the first-phase bridge arm, the second-phase bridge arm and the third-phase bridge arm, and the switch module of the target lower bridge arm is the switch module of the lower bridge arm of at least one of the bridge arms except the bridge arm where the switch module of the target upper bridge arm is located,
   wherein in the case that the switch module of the target upper bridge arm and the switch module of the target lower bridge arm are controlled to be turned on, a discharge circuit for the battery pack is formed, with a current going through the battery pack, the main positive switch, the switch module of the target upper bridge arm, a stator inductor of the motor corresponding to the switch module of the target upper bridge arm, a stator inductor of the motor corresponding to the switch module of the target lower bridge arm, the switch module of the target lower bridge arm, the main negative switch and the battery pack in the order, and
   in the case that the switch module of the target upper bridge arm and the switch module of the target lower bridge arm are controlled to be turned off, a charge circuit for the battery pack is formed, with a current going through a stator inductor of the motor corresponding to the switch module of the target upper bridge arm, the switch module of the target upper bridge arm, the main positive switch, the battery pack, the main negative switch, the switch module of the target lower bridge arm, a stator inductor of the motor corresponding to the switch module of the target lower bridge arm in the order.

2. The battery heating system according to claim 1, wherein the inverter further comprises:
   a supporting capacitor connected in parallel with the first-phase bridge arm.

3. The battery heating system of claim 1, further comprising:
   a Z-source network circuit located between the switch assembly and the inverter, wherein the Z-source network circuit is configured to disconnect a circuit in which the inverter and the battery pack are contained in the case that the switch module of the upper bridge arm and the switch module of the lower bridge arm of any bridge arm among the first-phase bridge arm, the second-phase bridge arm and the third-phase bridge arm are turned on at the same time.

4. The battery heating system according to claim 3, wherein the Z-source network circuit comprises a first diode, a first inductor, a first capacitor, a second inductor and a second capacitor;
   an anode of the first diode is connected to a positive electrode of the battery pack, and a cathode of the first diode is connected to one terminal of the first inductor and one terminal of the first capacitor;
   the other terminal of the first inductor is connected to one terminal of the second capacitor and the inverter;
   the other terminal of the first capacitor is connected to the other terminal of the second inductor and the inverter;
   one terminal of the second inductor is connected to a negative electrode of the battery pack and the other terminal of the second capacitor, and the other terminal of the second inductor is connected to the inverter;
   the one terminal of the second capacitor is connected to the inverter.

5. The battery heating system according to claim 1, wherein the switch module comprises a diode;
   in terms of the switch module of an upper bridge arm among the upper bridge arms, an anode of the diode is connected to the connection point of the upper bridge arm and a corresponding lower bridge arm, and a cathode of the diode is located between the upper bridge arm and a positive electrode of the battery pack;
   in terms of the switch module of a lower bridge arm among the lower bridge arms, the anode of the diode is located between the lower bridge arm and a negative electrode of the battery pack, and the cathode of the diode is connected to the connection point of a corresponding upper bridge arm and the lower bridge arm.

6. The battery heating system of claim 1, wherein the buffer module comprises a first resistor and a third capacitor;
   in terms of the buffer module connected in parallel with the switch module of the upper bridge arm, one terminal of the first resistor is located between the switch module of the upper bridge arm and a positive electrode of the battery pack, and the other terminal of the first resistor is connected to one terminal of the third capacitor, and the other terminal of the third capacitor is connected to the connection point of the upper bridge arm and the lower bridge arm;
   in terms of the buffer module connected in parallel with the switch module of the lower bridge arm, one terminal of the first resistor is connected to the connection point of the upper bridge arm and the lower bridge arm, and the other terminal of the first resistor is connected to one terminal of the third capacitor, and the other terminal of the third capacitor is located between the switch module of the lower bridge arm and a negative electrode of the battery pack.

7. The battery heating system according to claim 6, wherein the first resistor has a resistance ranging from 0.1 ohm to 20 ohms, and the third capacitor has a capacitance ranging from 0.1 microfarads to 15 microfarads.

8. The battery heating system of claim 1, wherein the buffer module comprises a second resistor, a fourth capacitor and a second diode;
   in terms of the buffer module connected in parallel with the switch module of the upper bridge arm, one terminal of the second resistor is located between the switch module of the upper bridge arm and a positive electrode of the battery pack, the other terminal of the second resistor is connected to one terminal of the fourth capacitor, the other terminal of the fourth capacitor is connected to the connection point of the upper bridge arm and the lower bridge arm, an anode of the second diode is connected to one terminal of the second resistor and a cathode of the second diode is connected to the other terminal of the second resistor;
   in terms of the buffer module connected in parallel to the switch module of the lower bridge arm, one terminal of the second resistor is connected to the connection point of the upper bridge arm and the lower bridge arm, the other terminal of the second resistor is connected to one terminal of the fourth capacitor, the other terminal of the fourth capacitor is located between the switch module of the lower bridge arm and a negative electrode of the battery pack, the anode of the second diode is connected to one terminal of the second resistor and a cathode of the second diode is connected to the other terminal of the second resistor.

9. The battery heating system according to claim 8, wherein the second resistor has a resistance ranging from 0.1 ohm to 20 ohm, and the fourth capacitor has a capacitance ranging from 0.1 microfarad to 15 microfarad.

10. The battery heating system according to claim 1, wherein the switch assembly comprises a main positive switch connected to a positive electrode of the battery pack and/or a main negative switch connected to a negative electrode of the battery pack.

11. The battery heating system according to claim 1, further comprising a safety module provided between a positive electrode of the battery pack and the switch assembly, wherein the safety module is configured to disconnect a connection of the battery pack from the battery heating system.

12. The battery heating system according to claim 1, further comprising a current sensor provided between a negative electrode of the battery pack and the switch assembly, wherein the current sensor is configured to collect currents.

13. The battery heating system according to claim 1, further comprising a battery management module configured to send a control signal to the motor controller to control the motor controller to output the driving signals.

* * * * *